US012618535B1

(12) United States Patent
Lee et al.

(10) Patent No.: US 12,618,535 B1
(45) Date of Patent: May 5, 2026

(54) VINTAGE CAR HEADLIGHT WITH LED LIGHT SOURCE

(71) Applicant: SUPERLEE CORPORATION, Tainan City (TW)

(72) Inventors: Tsung-Keng Lee, Tainan City (TW); Meng-Huang Lin, Tainan City (TW)

(73) Assignee: SUPERLEE CORPORATION, Tainan City (TW)

( * ) Notice: Subject to any disclaimer, the term of this patent is extended or adjusted under 35 U.S.C. 154(b) by 0 days.

(21) Appl. No.: 19/085,079

(22) Filed: Mar. 20, 2025

(51) Int. Cl.

| | |
|---|---|
| ***F21S 41/47*** | (2018.01) |
| ***F21S 41/148*** | (2018.01) |
| ***F21S 41/19*** | (2018.01) |
| ***F21S 41/32*** | (2018.01) |
| ***F21S 41/39*** | (2018.01) |
| ***F21S 45/47*** | (2018.01) |
| ***F21S 45/49*** | (2018.01) |
| *F21W 102/13* | (2018.01) |
| *F21Y 101/00* | (2016.01) |
| *F21Y 115/10* | (2016.01) |

(52) U.S. Cl.
CPC ........... *F21S 41/148* (2018.01); *F21S 41/192* (2018.01); *F21S 41/321* (2018.01); *F21S 41/39* (2018.01); *F21S 41/47* (2018.01); *F21S 45/47* (2018.01); *F21S 45/49* (2018.01); *F21W 2102/13* (2018.01); *F21Y 2101/00* (2013.01); *F21Y 2115/10* (2016.08)

(58) Field of Classification Search
CPC . F21Y 2101/00; F21Y 2115/01; F21S 41/148; F21S 41/39; F21S 41/47; F21S 45/49
See application file for complete search history.

(56) References Cited

U.S. PATENT DOCUMENTS

| | | | | |
|---|---|---|---|---|
| 2,277,563 | A * | 3/1942 | Scott ........................ | F21S 41/43<br>362/255 |
| 2003/0227774 | A1* | 12/2003 | Martin .................... | F21V 29/77<br>362/240 |
| 2014/0355286 | A1* | 12/2014 | Arita ........................ | F21S 41/19<br>362/516 |
| 2017/0234503 | A1* | 8/2017 | Buffone ................ | F21S 41/148<br>362/509 |

* cited by examiner

*Primary Examiner* — Omar Rojas Cadima
(74) *Attorney, Agent, or Firm* — Rosenberg, Klein & Lee

(57) ABSTRACT

A vintage car headlight with light emitting diode (LED) light sources including a reflective lamp holder, a heat conducting unit, a low-beam unit, a high-beam unit, a light shading unit, and an optical lampshade is provided. The reflective lamp holder includes a light concentrating and reflecting surface and an installation slot. The heat conducting unit is mounted in the installation slot and composed of a vertical wall corresponding to the installation slot, and an assembly wall disposed on the vertical wall and extending away from the installation slot. The low-beam unit and the high-beam unit are mounted to the assembly wall. The light shading unit includes a vertical segment and a horizontal segment respectively connected to the assembly wall and extending toward the vertical wall. The optical lampshade is connected to the reflective lamp holder and having an optical diffusion surface formed by a plurality of optical diffusion areas.

2 Claims, 4 Drawing Sheets

VINTAGE CAR HEADLIGHT WITH LED LIGHT SOURCE

BACKGROUND OF THE INVENTION

Field of the Invention

The present invention relates to a vintage car headlight with LED light sources, especially to a vintage car headlight which uses light emitting diodes (LED) as light sources of low-beam and high-beam lights and converts light from a point light source into a light surface for compliance with regulatory requirements. A vintage charm is provided due to patterns of optical diffusion areas on an inner surface of a transparent optical lampshade.

Description of Related Art

A vintage car is not only having a sense of nostalgia and historic meaning, but also showing design concepts, standards of workmanship, and popular culture at that time. That's why the vintage car is valuable. Thus vintage cars are now collectables. Some collectors even restore and keep vintage cars on the road to make the most of them.

In early times, light sources of high beams and low beams in headlights are bulbs which are consumables with limited service life. When the bulbs are discontinued, no bulbs with the same specifications can be used for replacement so that users can't drive the vintage car on the road. Once headlights with modern style are used, the new headlights and old-fashioned vintage car don't match with each other.

Thus there is room for improvement and there is a need to provide a vintage headlight which is not only compliant with regulatory standards but also matched to the vintage car.

SUMMARY OF THE INVENTION

Therefore, it is a primary object of the present invention to provide a car headlight which uses light emitting diode (LED) as light sources and offers a vintage charm due to patterns of optical diffusion areas on an inner surface of a transparent optical lampshade.

In order to achieve the above object, a vintage car headlight with LED light sources according to the present invention includes a reflective lamp holder, a heat conducting unit, a low-beam unit, a high-beam unit, a light shading unit, and an optical lampshade.

The reflective lamp holder is bowl-shaped and provided with a concave installation slot and a light concentrating and reflecting surface formed on an inner surface of the reflective lamp holder.

The heat conducting unit is mounted in the installation slot and composed of a vertical wall arranged with respect to the installation slot, and an assembly wall disposed on a surface of one side of the vertical wall and extending toward a direction away from the installation slot. A distance between an upper surface and a lower surface of the assembly wall is tapered from one end close to the vertical wall toward another end away from the vertical wall. Thus the upper surface is inclined downward while the lower surface is inclined upward.

The low-beam unit is mounted to the upper surface of the assembly wall and provided with a low-beam circuit board and at least one low-beam LED light source disposed on the low-beam circuit board.

The high-beam unit is disposed on the lower surface of the assembly wall and composed of a high-beam circuit board and at least one high-beam LED light source arranged at the high-beam circuit board.

The light shading unit is composed of a vertical segment and a horizontal segment. The vertical segment is connected to the end of the assembly wall away from the vertical wall. The horizontal segment is extending from an upper edge of the vertical segment toward the vertical wall and having a curved edge on an end.

The optical lampshade is connected to a front end of the reflective lamp holder and provided with an optical diffusion surface which is formed on an inner surface of the optical lampshade and having a plurality of optical diffusion areas. The optical lampshade is transparent so that lattice-shaped outline of the optical diffusion areas can be seen from the outside of the optical lampshade.

Preferably, at least one bump is arranged at a surface of the end of the assembly wall away from the vertical wall. At least one hole is formed on the vertical segment of the light shading unit for mounting the bump correspondingly and further positioning the light shading unit on the heat conducting unit.

DETAILED DESCRIPTION OF THE PREFERRED EMBODIMENT

In order to learn technical content, features, and functions of the present invention more clearly and completely, please refer to the following embodiments with related figures and reference signs.

Figure 1:
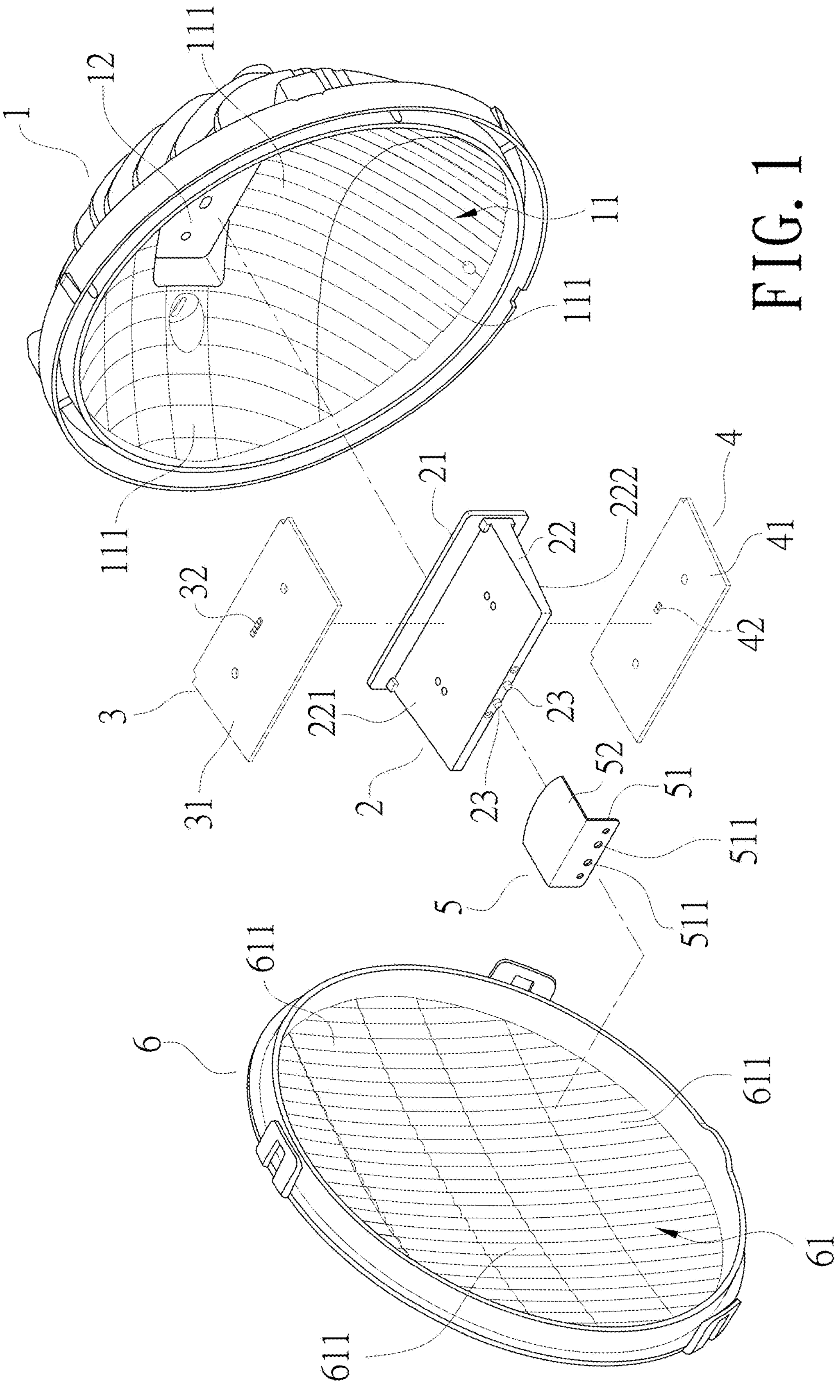
FIG. 1 is an exploded view according to the present invention.

Refer to FIG. 1, a vintage car headlight with light emitting diode (LED) light sources according to the present invention includes a reflective lamp holder 1, a heat conducting unit 2, a low-beam unit 3, a high-beam unit 4, a light shading unit 5, and an optical lampshade 6.

The reflective lamp holder 1 is bowl-shaped and an inner surface of the reflective lamp holder 1 forms a light concentrating and reflecting surface 11 which includes a plurality of light concentrating and reflecting areas 111. By reflection of the light concentrating and reflecting areas 111, light from the low-beam unit 3 and the high-beam unit 4 is concentrated. The inner surface of the reflective lamp holder 1 is provided with a concave installation slot 12.

Figure 2:
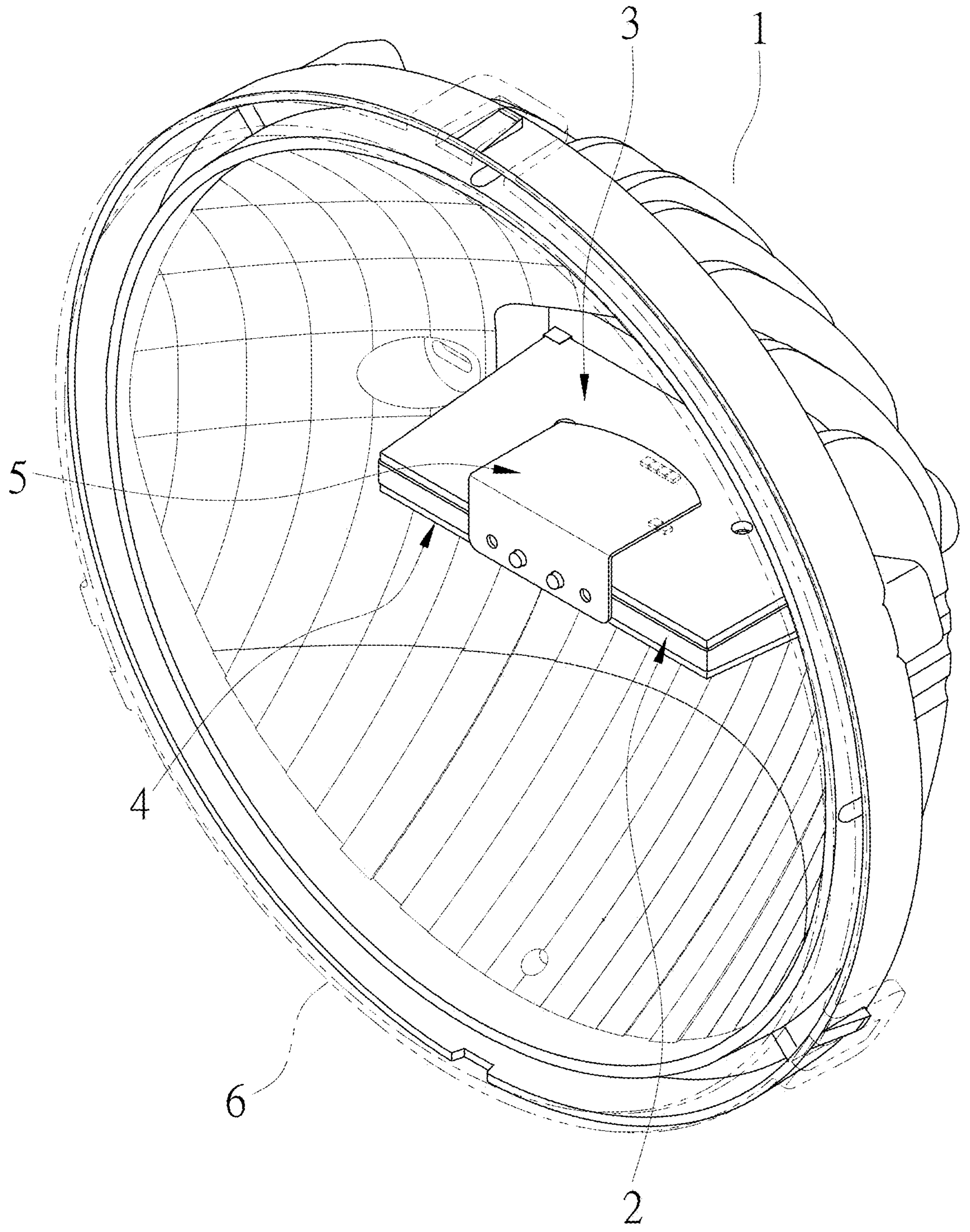
FIG. 2 is a perspective view according to the present invention.
Figure 3:
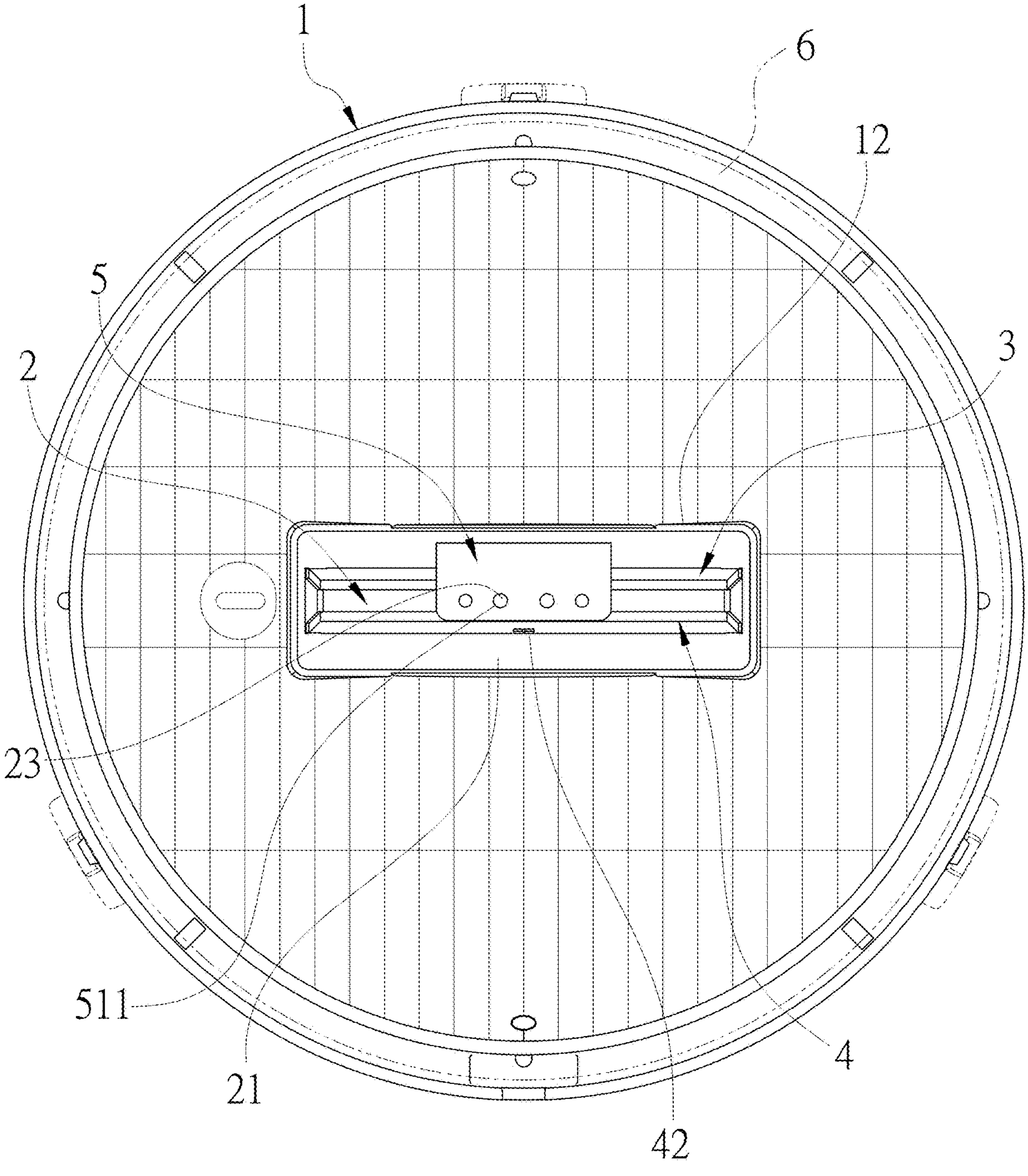
FIG. 3 is a front view according to the present invention.
Figure 4:
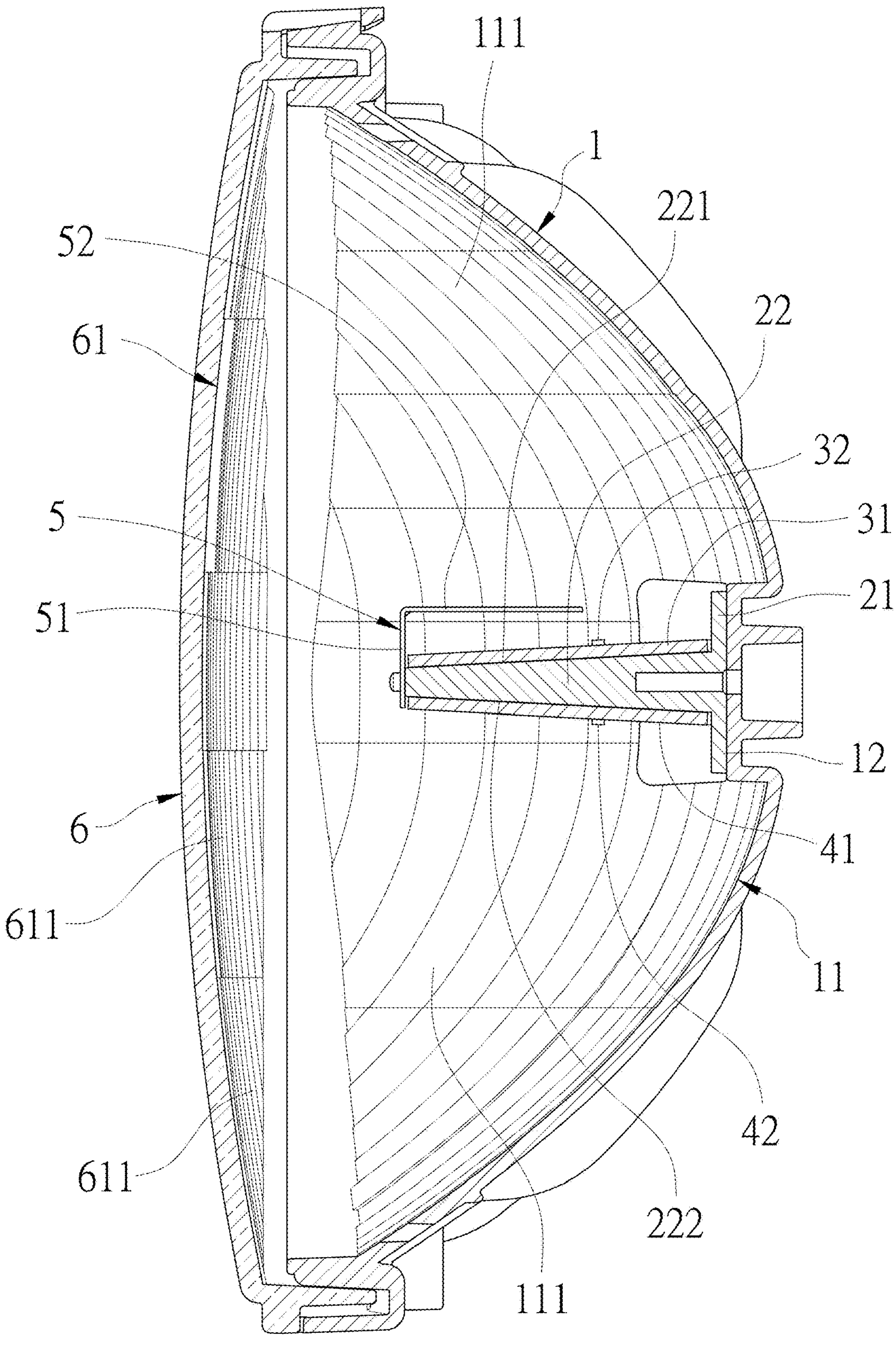
FIG. 4 is a side sectional view according to the present invention.

Also refer to FIG. 2-FIG. 4, the heat conducting unit 2 is mounted in the installation slot 12 and composed of a vertical wall 21 arranged with respect to the installation slot 12, and an assembly wall 22 disposed on a surface of one side of the vertical wall 21 and extending toward a direction away from the installation slot 12. A distance between an upper surface 221 and a lower surface 222 of the assembly wall 22 is tapered from one end of the assembly wall 22 close to the vertical wall 21 toward another end of the assembly wall 22 away from the vertical wall 21. Thus the upper surface 221 is gradually inclined downward toward the end away from the vertical wall 21 while the lower surface 222 is gradually inclined upward toward the end away from the vertical wall 21.

The low-beam unit 3 is disposed on the upper surface 221 of the assembly wall 22 and composed of a low-beam circuit board 31 and at least one low-beam LED light source 32 mounted to the low-beam circuit board 31.

The high-beam unit 4 is arranged at the lower surface 222 of the assembly wall 22 and provided with a high-beam circuit board 41 and at least one high-beam LED light source 42 mounted to the high-beam circuit board 41.

The light shading unit 5 consists of a vertical segment 51 and a horizontal segment 52. The vertical segment 51 of the light shading unit 5 is connected to the assembly wall 22 of the heat conducting unit 2 and located at the end of the assembly wall 22 away from the vertical wall 21. The horizontal segment 52 is extending from an upper edge of the vertical segment 51 toward the vertical wall 21 and having a curved edge on an end.

The optical lampshade 6 is connected to a front end of the reflective lamp holder 1 and provided with an optical diffusion surface 61 which is formed on an inner surface of the optical lampshade 6 and composed of a plurality of optical diffusion areas 611. The optical lampshade 6 is transparent so that lattice-shaped outline of the optical diffusion areas 611 can be seen from the outside of the optical lampshade 6.

While being assembled (also refer to FIG. 2-4), the vertical wall 21 of the heat conducting unit 2 is mounted into the installation slot 12 on the inner surface of the reflective lamp holder 1. A screw (not shown in figure) is inserted through an outer side of the reflective lamp holder 1 at a position corresponding to the installation slot 12 and threaded into the heat conducting unit 2 for securing the heat conducting unit 2 to the reflective lamp holder 1. The low-beam unit 3 and the high-beam unit 4 are respectively mounted to the upper surface 221 and the lower surface 222 of the assembly wall 22 of the heat conducting unit 2. Then two screws (not shown in figure) are inserted through the low-beam circuit board 31 and the high-beam circuit board 41 correspondingly and threaded into the assembly wall 22 of the heat conducting unit 2 for securing the low-beam unit 3 and the high-beam unit 4 respectively to the upper surface 221 and the lower surface 222 of the assembly wall 22 of the heat conducting unit 2. The vertical segment 51 of the light shading unit 5 is attached to the end of the assembly wall 22 away from the vertical wall 21. Three screws (not shown in figure) are inserted through the vertical segment 51 and threaded into the assembly wall 22 for fixing the light shading unit 5 on the heat conducting unit 2. Now the curved edge of the horizontal segment 52 of the light shading unit 5 is close to the low-beam LED light source 32 and shielding a part of light from the low-beam LED light source 32. The optical lampshade 6 is connected to the reflective lamp holder 1 with the optical diffusion surface 61 facing the reflective lamp holder 1.

When the low-beam unit 3 and the high-beam unit 4 haven't been turned, the lattice-shaped outline of the respective optical diffusion areas 611 on the optical diffusion surface 61 of the inner surface of the optical lampshade 6 can be seen from the outside of the optical lampshade 6. Thus the car light offers a vintage charm. When the low-beam LED light source 32 is turned on to emit light, the light originally concentrated is diffused by the optical diffusion areas 611 on the optical diffusion surface 61 of the inner surface of the optical lampshade 6 to form a low-beam light pattern compliant with regulatory requirements after a part of the light from the low-beam LED light source 32 being blocked by the light shading unit 5 and the rest light being reflected and concentrated by the light concentrating and reflecting areas 111 on the light concentrating and reflecting surface 11 of the reflective lamp holder 1. When the high-beam LED light source 42 is turned on to emit light, the light originally concentrated is diffused to form a high-beam light pattern compliant with regulatory requirements. The light emitted is first reflected and concentrated by the light concentrating and reflecting areas 111 on the light concentrating and reflecting surface 11 of the reflective lamp holder 1 and then diffused by the optical diffusion areas 611 on the optical diffusion surface 61 of the inner surface of the optical lampshade 6.

In a preferred embodiment (as shown in FIG. 1, FIG. 2, and FIG. 3), the heat conducting unit 2 is further provided with at least one bump 23 arranged at a surface of the end of the assembly wall 22 away from the vertical wall 21. At least one hole 511 is formed on the vertical segment 51 of the light shading unit 5 for mounting the bump 23 correspondingly and further positioning the light shading unit 5 on the heat conducting unit 2. Thereby the light shading unit 5 is threaded to the heat conducting unit 2 by the three screws conveniently.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A vintage car headlight with light emitting diode (LED) light sources, comprising a reflective lamp holder, a heat conducting unit, a low-beam unit, a high-beam unit, a light shading unit, and an optical lampshade;

wherein the reflective lamp holder is bowl-shaped and provided with a substantially blind concave installation slot and a light concentrating and reflecting surface formed on an inner surface of the reflective lamp holder;

wherein the heat conducting unit is composed of a vertical wall mounted in the installation slot, and an assembly wall disposed at a first end thereof on a surface of the vertical wall and extending away from the installation slot toward a second end thereof;

wherein the assembly wall is tapered toward the second end thereof such that an upper surface of the assembly wall is inclined downward toward the second end, and a lower surface of the assembly wall is inclined upward toward the second end;

wherein the low-beam unit is disposed on the inclined upper surface of the assembly wall and provided with a low-beam circuit board and at least one low-beam LED light source arranged at the low-beam circuit board;

wherein the high-beam unit is disposed on the inclined lower surface of the assembly wall and provided with a high-beam circuit board and at least one high-beam LED light source disposed on the high-beam circuit board;

wherein the light shading unit consists of a vertical segment and a horizontal segment;

wherein the vertical segment is connected to the second end of the assembly wall;

wherein the horizontal segment extends from an upper edge of the vertical segment toward the vertical wall above the inclined upper surface of the assembly wall, the horizontal segment having a curved edge on an end thereof;

wherein the optical lampshade is connected to a front end of the reflective lamp holder and provided with an optical diffusion surface, the optical diffusion surface being formed on an inner surface of the optical lampshade and having a plurality of optical diffusion areas; and wherein the optical lampshade is transparent such that a lattice-shaped outline of the optical diffusion areas is visible from an outside of the optical lampshade.

2. The vintage car headlight with LED light sources as claimed in claim 1, wherein at least one bump is arranged at a surface of the second end of the assembly wall; and at least one hole is formed on the vertical segment of the light shading unit and configured to mount a corresponding one of the at least one bump to thereby further position the light shading unit on the heat conducting unit.

* * * * *